US006149572A

United States Patent [19]
Knelson

[11] Patent Number: 6,149,572
[45] Date of Patent: Nov. 21, 2000

[54] CONTINUOUS CENTRIFUGAL SEPARATOR OF HEAVIER PARTICULATE MATERIALS FROM LIGHT PARTICULATE MATERIALS IN A SLURRY

[76] Inventor: Benjamin Knelson, 20321-86th Avenue, Langley, British Columbia, Canada, V2A 6Y3

[21] Appl. No.: 09/120,135

[22] Filed: Jul. 22, 1998

[51] Int. Cl.[7] .............................. B04B 11/04; B01D 43/00

[52] U.S. Cl. ................................ 494/37; 494/29; 494/56; 494/80; 210/781

[58] Field of Search ................................ 494/27, 29, 56, 494/80, 37; 210/781, 787, 772, 369

[56] References Cited

U.S. PATENT DOCUMENTS

| | | |
|---|---|---|
| 1,882,389 | 10/1932 | MacIsaac . |
| 3,823,869 | 7/1974 | Loison . |
| 4,608,040 | 8/1986 | Knelson . |
| 4,981,219 | 1/1991 | Burnell et al. . |
| 5,222,933 | 6/1993 | Knelson et al. . |
| 5,338,284 | 8/1994 | Knelson . |
| 5,462,513 | 10/1995 | McAlister . |
| 5,586,965 | 12/1996 | Knelson . |
| 5,601,523 | 2/1997 | Knelson . |
| 5,601,524 | 2/1997 | Knelson . |

FOREIGN PATENT DOCUMENTS

| | | |
|---|---|---|
| 17487/34 | 5/1934 | Australia . |
| 22055/35 | 4/1935 | Australia . |
| 1632324 | 10/1970 | Germany . |
| 2133722 | 8/1984 | United Kingdom . |

*Primary Examiner*—David A. Reifsnyder
*Attorney, Agent, or Firm*—A. D. Battison; M. E. Thrift; M. Williams

[57] ABSTRACT

A centrifuge bowl for separating heavier particles from lighter particles and water comprises a first conical bowl wall leading to a pair of annular recesses at actually spaced positions. Each recess is generally re-shaped with an upper side wall, a lower side wall and a base. The base contains a plurality of angularly spaced discharge ducts each having a mouth projecting through the base into the interior of the bowl for collecting the heavier particles. A pinch valve is formed as an integral assembly with the mouth and duct and is mounted within a housing carried within the wall of the bowl. The housing, valve and duct can therefore be removed as a separate assembly by pulling from a chamber within the wall of the bowl. A compression fluid supply duct passes through the wall to communicate with the chamber. Each recess includes injection openings in the upper and lower side walls of the recess arranged to inject fluidizing water in a direction generally parallel to the base and across the mouth of each discharge duct. The injection openings are inclined so as to tend to direct the water around the recess.

16 Claims, 7 Drawing Sheets

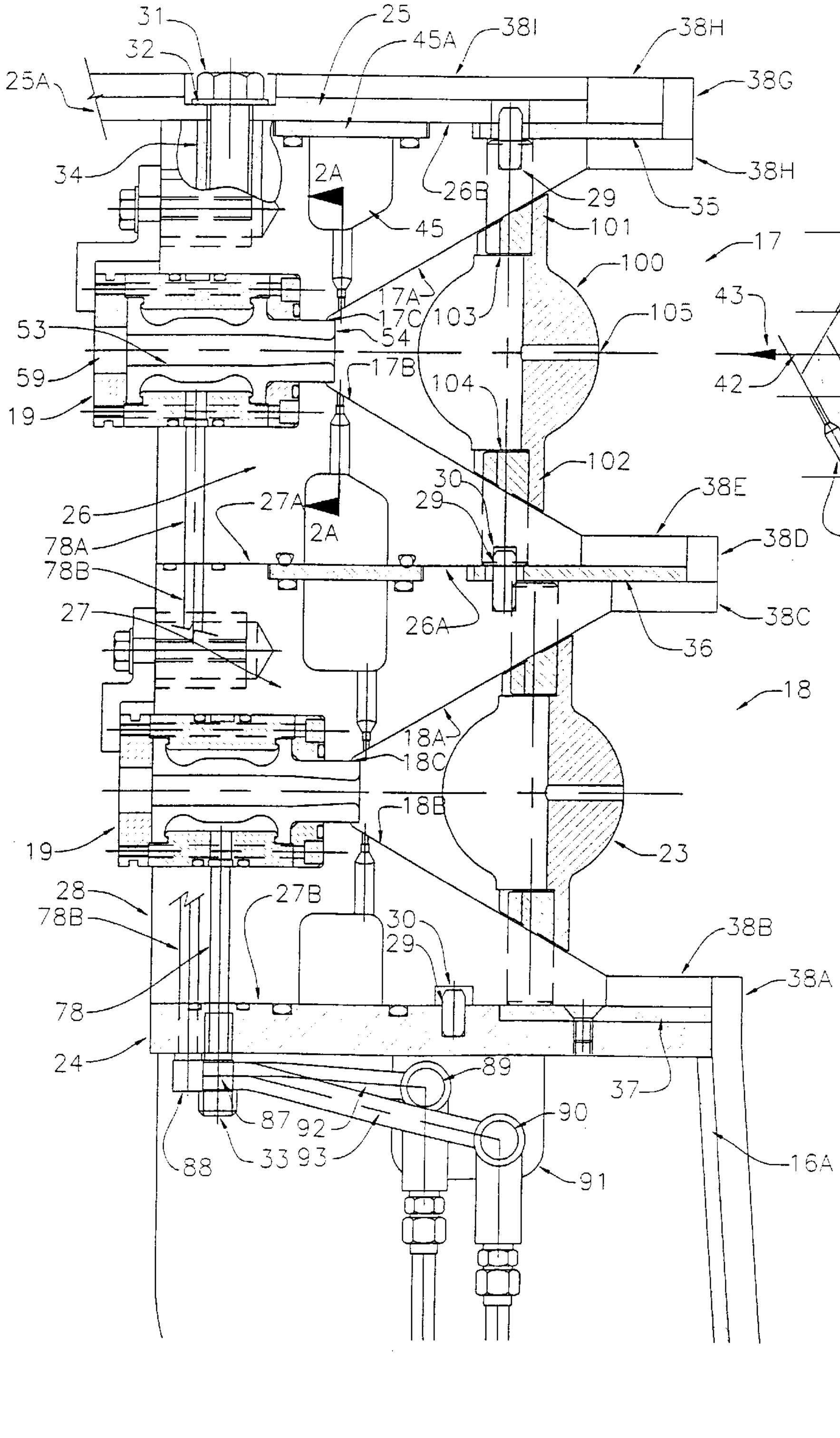
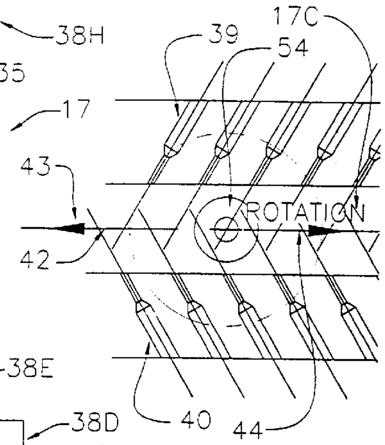
FIG. 2A
Fig.2

CONTINUOUS CENTRIFUGAL SEPARATOR OF HEAVIER PARTICULATE MATERIALS FROM LIGHT PARTICULATE MATERIALS IN A SLURRY

The invention relates to the continuous centrifugal separation of heavier particulate materials from light in particulate materials in a slurry of the materials, in which the slurry is passed over the peripheral wall of the centrifuge bowl for collection of the heavier materials on the wall of the bowl with a plurality of discharge openings at angularly spaced positions around the wall to allow the heavier materials to discharge from the bowl while the slurry runs continuously through the bowl.

BACKGROUND OF THE INVENTION

The present inventor has the following patents which disclose machines of this general type and features which relate to such machines:

| | |
|---|---|
| U.S. Pat. No. 5,222,933 | Issued December 13, 1994 |
| U.S. Pat. No. 5,338,284 | Issued August 16, 1994 |
| U.S. Pat. No. 5,586,965 | Issued December 24, 1996 |
| U.S. Pat. No. 5,601,523 | Issued February 11, 1997 |
| U.S. Pat. No. 5,601,524 | Issued February 11, 1997 |
| U.S. Pat. No. 4,608,040 | Issued August 26, 1986 |
| PCT 5,586,965 | Published January 30, 1997 |

In addition to the above patents of the present inventor, the following patents by other inventors show machines and features of a similar nature:

| | | |
|---|---|---|
| McAllister | U.S. Pat. No. 5,462,513 | December 31, 1995 |
| Classicon | UK 2,133,722 | August 1, 1984 |
| Burnell | U.S. Pat. No. 4,981,219 | January 1, 1991 |
| MacNicol | Australia 1,748,7/34 | May 8, 1934 |
| | Australia 22055/35 | April 2, 1935 |
| MacIssaac | U.S. Pat. No. 1,882,389 | October 11, 1932 |
| Loison | U.S. Pat. No. 3,823,869 | July 16, 1974 |
| Telle | DT 1,632,324 | October 29, 1970 |

Knelson 284 discloses a machine of this general type which is intended to operate continuously in the sense that the feed slurry is supplied continuously to the centrifuge bowl while the discharge of heavier materials collected on the wall of the bowl is effected intermittently using a pinch valve at each discharge opening.

Knelson 523, 524, 965 and the PCT disclose improvements in the above machine all of which have contributed to an improved functional machine.

Knelson 933 discloses a batch machine which operates intermittently and must be halted regularly for the collection of the heavier materials through a discharge opening at the base of the bowl. There is no continuous discharge of the heavier materials through discharge openings and the heavier materials is therefore collected in the bowl for intermittent or batch processing.

Knelson 040 discloses a particular arrangement of the fluidizing injection openings which are conventional in an arrangement of this type.

McAllister discloses a continuous discharge machine which also uses pinch valves at a series of discharge openings around a collection zone of the bowl.

MacNicol in the old two Australian patents discloses a particular bowl arrangement with injection openings at the base of a series of axially spaced riffles for collection of materials of the batch processing within the riffles.

Telle discloses a de-watering system for extracting water from particulate materials in which the particulate materials are collected on the wall of a centrifuge bowl and discharged outwardly through discharge ducts each of which has a pinch valve for controlling the discharge of the particulate materials. De-watering systems are of a different type from the particulate separation machines with which the present invention is concerned.

MacIssaac discloses a machine for separating particulate materials in which the heavier materials are collected on the wall of the bowl and intermittently discharged by opening valves located inside the bowl.

Classicon discloses a separation system for different particulate materials in which there are series of actually spaced discharged outlets each of which can be opened and closed by a valve arrangements.

Loison discloses a de-watering device for separating liquid from a solid in which the solids are collected outwardly of the bowl and are discharged by periodically opening a valve arrangement.

Burnell discloses an apparatus for separating different particles including a series of angularly spaced pockets each of which converges to a discharge duct through which the heavier materials are discharged on a continuous basis.

SUMMARY OF THE INVENTION

It is one object of the present invention to provide an improved method for separating particulate materials of different density in which the feed is substantially continuous and the heavier materials are discharged through discharge openings arranged on the peripheral wall.

According to a first aspect of the invention, therefore, there is provided a method of separating a slurry containing intermixed particulate materials of different specific gravity comprising:

providing a centrifuge bowl having a peripheral wall and an open mouth;

rotating the bowl about a longitudinal axis so as to rotate the peripheral wall around the axis;

feeding the materials to the bowl so as to pass over the peripheral wall and causing a heavier portion of the materials to collect on the peripheral wall while a lighter portion of the materials in the slurry escapes over the open mouth;

defining on the peripheral wall at least one axially localized, annular recess for collecting the heavier portion of the materials;

defining in the recess an upper side wall, a lower side wall and an annular base interconnecting the side walls;

and injecting fluidizing liquid into the recess through a plurality of fluid injection ports arranged at spaced positions around the recess for fluidizing the material in the recess, the injection ports being located in at least one of the side walls.

Preferably some injection ports are located in the upper side wall and some are located in the lower side wall.

Preferably the injection ports are arranged to inject liquid in a direction substantially parallel to the base.

Preferably at least some of the injection ports are arranged in a direction inclined to a line parallel to the axis so as to tend to direct the liquid angularly around the recess.

Preferably the injection ports are arranged on the side wall at a position adjacent to and spaced from the base.

According to a second aspect of the invention there is provided a method of separating a slurry containing intermixed particulate materials of different specific gravity comprising:

providing a centrifuge bowl having a peripheral wall and an open mouth;

rotating the bowl about a longitudinal axis so as to rotate the peripheral wall around the axis;

feeding the materials to the bowl so as to pass over the peripheral wall and causing a heavier portion of the materials to collect on the peripheral wall while a lighter portion of the materials in the slurry escapes over the open mouth;

defining on the peripheral wall at least one axially localized, annular recess for collecting the heavier portion of the materials;

defining in the recess an upper side wall, a lower side wall and an annular base interconnecting the side walls;

providing at the recess a plurality of angularly spaced discharge ports each for allowing materials collecting in the recess to discharge outwardly from the peripheral wall, each discharge port being located with a mouth in the base;

collecting the outwardly discharge materials;

and injecting fluidizing liquid into the recess through a plurality of fluid injection ports arranged at spaced positions around the recess for fluidizing the material in the recess;

the mouth of each discharge port having an injection port arranged to direct liquid across the mouth of the discharge port so as to sweep any material collected on the mouth from the mouth.

Preferably the injection ports are located in at least one of the side walls.

Preferably some injection ports are located in the upper side wall and some are located in the lower side wall.

Preferably the injection ports are arranged to inject liquid in a direction substantially parallel to the base.

Preferably at least some of the injection ports are arranged in a direction inclined to a line parallel to the axis so as to tend to direct the liquid angularly around the recess.

Preferably the injection ports are arranged on the side wall at a position adjacent to and spaced from the base.

Preferably there is provided within the recess in front of each discharge port a material guide body arranged to direct material passing to the discharge port around an outer periphery of the guide body, the guide body having a bore therethrough which is aligned with the discharge port to allow passage through the bore and into the discharge port of a cleaning probe.

According to a third aspect of the invention there is provided a method of separating a slurry containing intermixed particulate materials of different specific gravity comprising:

providing a centrifuge bowl having a peripheral wall, a base and an open mouth;

rotating the bowl about a longitudinal axis so as to rotate the peripheral wall around the axis;

feeding the materials to the bowl so as to pass over the peripheral wall and causing a heavier portion of the materials to collect on the peripheral wall while a lighter portion of the materials in the slurry escapes over the open mouth;

defining on the peripheral wall at least one axially localized, annular recess for collecting the heavier portion of the materials;

defining in the recess an upper side wall, a lower side wall and an annular base interconnecting the side walls;

providing at the recess a plurality of angularly spaced discharge ports each for allowing materials collecting in the recess to discharge outwardly from the peripheral wall, each discharge port being located with a mouth in the base;

collecting the outwardly discharge materials;

injecting fluidizing liquid into the recess through a plurality of fluid injection ports arranged at spaced positions around the recess for fluidizing the material in the recess;

providing a discharge opening in the bowl at the base of the bowl;

and periodically halting rotation of the bowl and feed of the slurry to the bowl and cleaning the bowl and the discharge ports by causing material in the bowl to collect at the base and discharge through the discharge opening.

One embodiment of the invention will now be described in conjunction with the accompanying drawings in which:

BRIEF DESCRIPTION OF THE DRAWINGS

FIG. 2 is a vertical cross sectional view similar to that of FIG. 1A on an enlarged scale showing only one side of the bowl.

FIG. 2A is a cross sectional view along the lines 2A—2A of FIG. 2.

In the drawings like characters of reference indicate corresponding parts in the different figures.

DETAILED DESCRIPTION

Figure 1A:
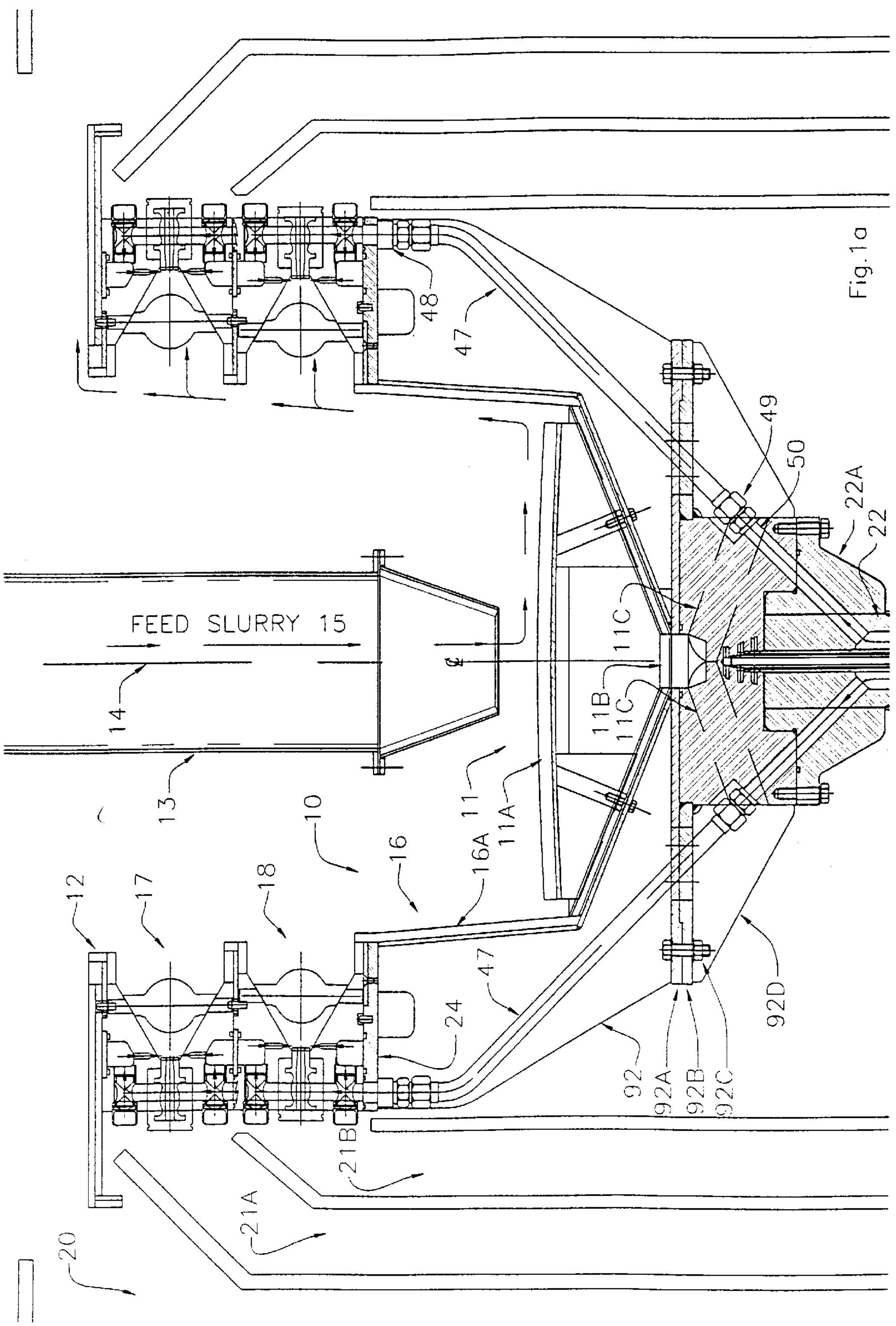
FIG. 1A is a vertical cross sectional view through a bowl of a continuous variable discharge separation system according to the present invention.
Figure 1B:
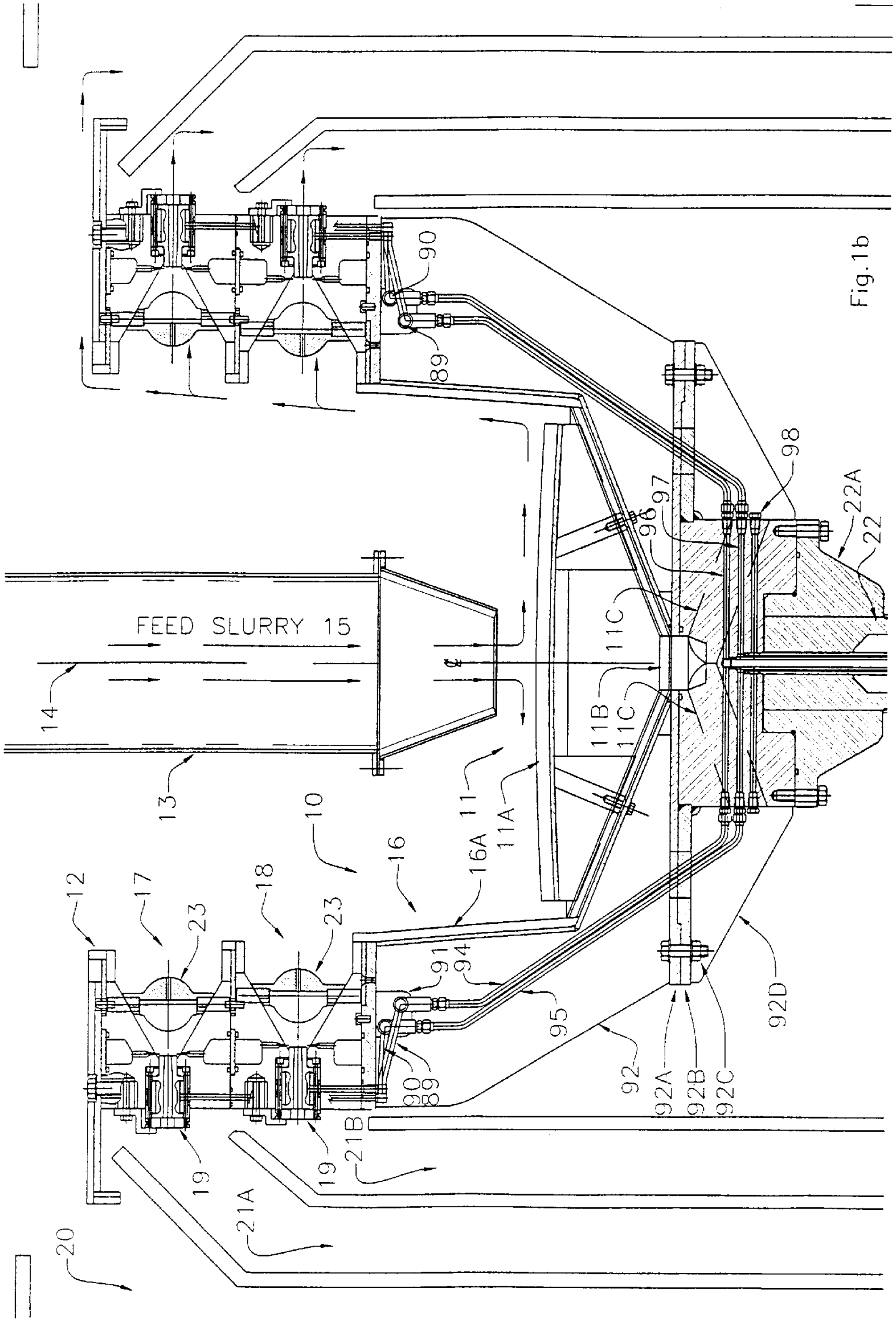
FIG. 1B is a vertical cross sectional view similar to that of FIG. 1A through the same bowl with the cross-section being angularly offset from that of FIG. 1A.

The centrifugal separation apparatus as shown in FIGS. 1 through 8 comprises a bowl generally indicated at 10 having a base 11 and an open mouth 12. A feed duct 13 comprises a vertical pipe mounted on a central axis 14 of the bowl for feeding a slurry 15 downwardly onto the base 11 of the bowl. The bowl 10 includes a peripheral wall 16 so that the slurry moving outwardly to the peripheral wall under centrifugal forces passes over the peripheral wall for collection of heavier materials in a pair of collection recesses 17 and 18 and for discharge of lighter materials and water over the open mouth 12.

The material collecting in the recesses 17 and 18 is discharged radially outwardly through a series of discharge ports at spaced positions around the recess. Each discharge port forms part of a discharge port and valve assembly 19.

The materials discharged from the open mouth is collected within a first launder 20 for collection and transportation to a discharge area. The heavier materials collected within the recess of ring 26 is discharged from the assembly 19 and collected within a middle launder 21A. Similarly the material discharged from the ring 27 is collected within a third launder 21B.

The bowl 10 is mounted on a shaft 22 for rotation about the axis 14.

Each discharge assembly 19 is associated with a respective one of a plurality of guide bodies 23 mounted within the respective recess in front of the discharge port.

U.S. Pat. No. 5,222,933 discloses further details of the base of the bowl including a base plate 11A and a bottom discharge opening 11B.

Reference is made to Knelson U.S. Pat. Nos. 5,601,523, 5,601,524 and WO97/02894 (mentioned above) all of which disclose various constructional features of the above machine. In particular construction of the shaft is shown in U.S. Pat. No. 5,601,524. Further the general shape of the bowl including a lower frustoconical portion 16A which directs the feed material across the recesses 17 and 18 is shown in U.S. Pat. No. 5,586,965. The further patents can be referred to for further details of the construction if required.

Figure 3:
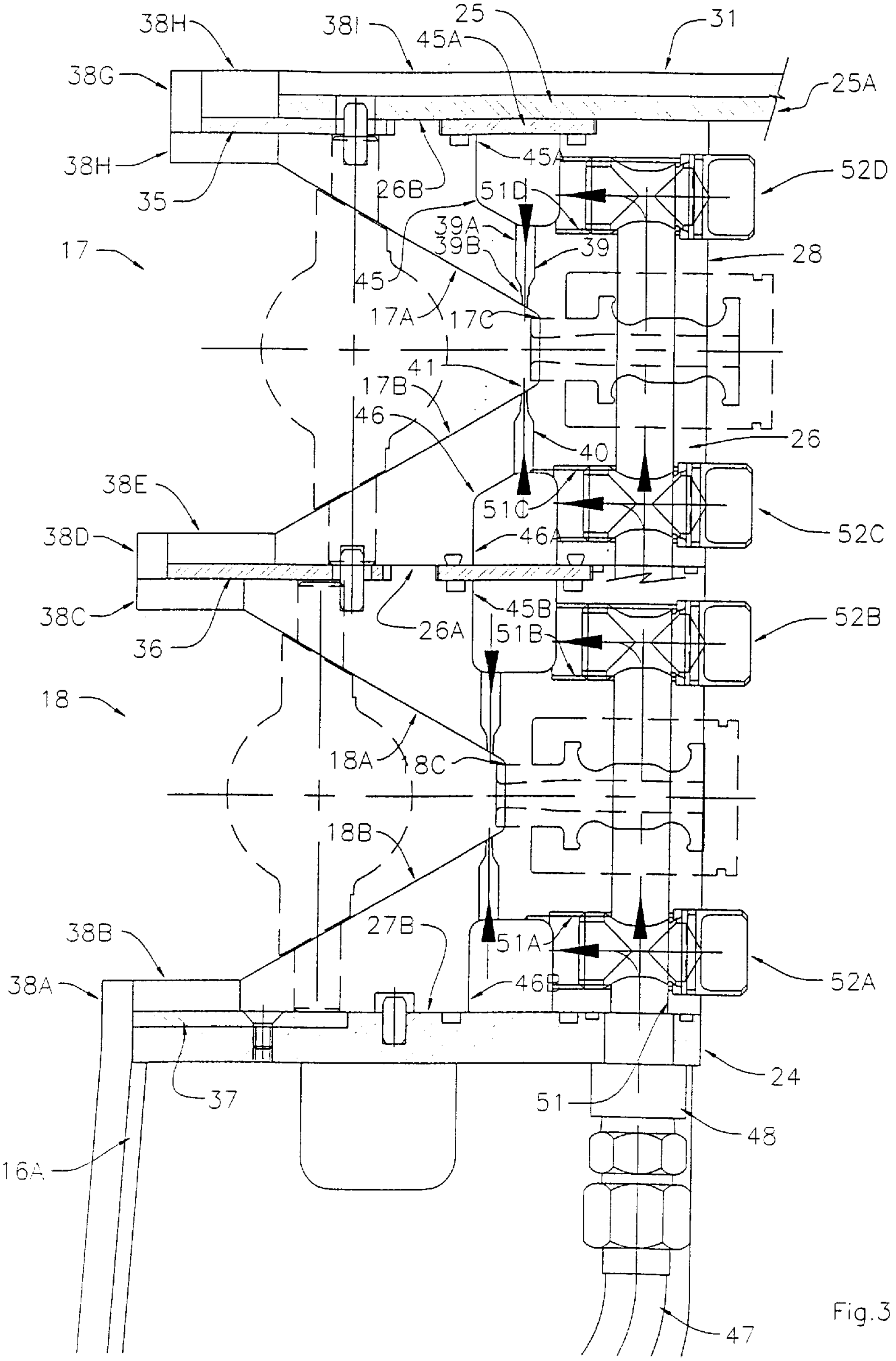
FIG. 3 is a vertical cross sectional view similar to that of FIG. 1B on an enlarged scale showing only one side of the bowl so as to show the injection fluidization water supply system.

The construction of the bowl in the area of the recesses 17 and 18 is shown in more detail in FIGS. 2, 2A and 3. Thus the collection area of the bowl comprises a metal bottom plate 24 and a metal top plate 25. The metal bottom plate 24 is attached to the first conical inclined section 16A of the wall of the bowl. In between the metal plates 24 and 25 is provided a pair of rings 26 and 27, each of which is molded or formed from a polyurethane material so as to be substantially rigid to provide some resilience and wear resistance. It is well known that centrifuge bowls accommodate significant levels of wear and for this purpose the use of polyurethane as a manufacturing material is well established.

Each of the rings 26 and 27 is generally annular defining a cylindrical outer surface 28. The ring 27 has a horizontal top surface 27A and horizontal bottom surface 27B. The latter is attached to the top surface of the plate 24 and is located in position on the plate by guides pins 29 at spaced positions around the annular plate 24, the guide pins being received within a recess 30 formed in the ring 27.

Similar the top ring 26 has a bottom surface 26A sitting in contact with the top surface 27A of the ring 27 and a top surface 26B contacting the bottom surface of the top plate 25.

The whole structure including the two rings, the top plate and the bottom plate is clamped together by a series of bolts 31 at angularly spaced positions around the structure. Each bolt has a head received within a recess in the top plate and a shaft 32 extending through to a nut 33 at the bottom of the bottom plate 24. A sleeve 34 extends from the bottom surface of the top plate to the top surface of the bottom plate thus maintaining an accurate spacing of the top and bottom plates and to avoid compression of the rings 26 and 27. The sleeve 34 is located within a respective hole extending through the rings 26 and 27.

The structure further includes three support plates 35, 36 and 37. Support plate 35 is clamped between to the underside of the top ring 25 and the top recess of ring 26 and extends forwardly therefrom to a front edge spaced inwardly of the ring 26. The plate 36 is clamped between the ring 26 and the ring 27 and extends forwardly from an inside edge of the rings to a position spaced inwardly therefrom. The bottom support plate 37 is carried on the bottom plate 24. The support plates carry liner strips formed of a resilient lining material which is replaceable to accommodate the wear of the passing particulate materials.

Thus the lining materials define a first layer 38A on the inside surface of the first conical wall 16A, a second annular portion 38B extending outwardly from the top edge of the portion 38A and extends inwardly to the inner most edge of the ring 28 on top of the support plate 37. Further liner portions are located on the bottom of the plate 36 as indicated at 38 at the inner edge of the plate 36 as indicated at 38D and on top of the plate 36 as indicated at 38E. The portions 38C and 38E are annular and extend outwardly to the inner most edges of the rings 26 and 27 so as to be contiguous therewith. The liner further includes a portion 38F underlying the top support plate 35, a portion 38G on top of the portion 38F and extending upwardly therefrom and an annular portion 38H which extends outwardly from the portion 38G across the top of the top support plate 35 to the innermost edge of top plate 25. The final layer completely covers the top of the top plate 25 to an outer edge or ring 25A of the top plate 25.

The support plates 35 and 36 are located in position by further locating pins 29 again arranged at angularly spaced positions around the bowl. The mating mounting slots in plates 35 and 36 provide for self centering the plates and allow for relative expansion and contraction of the steel support plates 35 and 36 and the polyurethane.

The inside surface of each of the rings 26 and 27 is shaped to define the recesses 17 and 18. Thus the ring 26 has a recess side wall 17A which is the upper side wall and a lower side wall 17B which converge outwardly to a flat base 17C with the base being annular and lying in a cylindrical surface surrounding the axis of the bowl. The recess 18 is similarly constructed including an upper side wall 18A, a lower side wall 18B and a base 18C. The shape and arrangement of the recesses is similar to that disclosed in U.S. Pat. No. 5,601,523.

Each recess has a plurality of fluid injection openings for injecting fluidizing water into the recess adjacent the base of the recess so the fluidizing water can flow through the recess and mix with the materials in the recess as described in the prior patents of Knelson.

In this arrangement, as is best shown in FIG. 3, the injection openings are arranged to a first series of injection openings 39 allocated in the upper wall 17A adjacent to but spaced inwardly from the base 17C. A second series 40 of injection openings is arranged in the lower wall 17B again at a position adjacent to but spaced from the base 17C. Both sets of injection openings lie in a common cylindrical surface 41 surrounding the axis of the bowl with the cylindrical surface 41 spaced inwardly from the cylindrical surface containing the base 17C. Thus the injection openings are arranged to inject to the fluidizing water in a direction lying in a surface parallel to the axis.

As shown in FIG. 2A, there is a series of such injection openings 39 and 40 at angularly spaced positions around the bowl. The injection openings lie in the cylindrical plane 41 but are inclined to a line 42 lying centrally of the base 17C so as to inject the water in a direction tending to flow in a direction 43 which is opposite to direction 44 of rotation of the bowl.

Each injection opening is shaped with a first wider portion 39A and a second narrower portion 39B with the second portion having a mouth breaking out on the respective side wall. The length of the narrower portion is as short as reasonably practical so as to maintain the duct forming the injection opening at the wider dimension 39A for communication of fluid therethrough with reduced possibility for blockages. However it is required that the mouth of the injection opening at the side wall be relatively small so as to provide a jet of the fluidizing water entering the recess at the side wall with that jet having sufficient fluid flow to cause a significant jet of the fluidizing liquid across the base toward the opposite side wall.

The injection openings 39 communicate with a water supply channel 45 formed in the upper part of the ring 26. Similarly the injection openings 40 communicate with a second water supply channel 46 in the lower part of the ring 26. The channel 45 is formed as an open top channel cut or formed in the upper surface 26B of the ring with that channel being closed by a closure plate 45A clamped in place by the upper plate 25. The channel 45 is thus annular and of generally rectangular cross section and extends around the full extent of the ring so to communicate fluid from the channel to each of the series of injection openings 39 which are located in a continuous row of the openings around the full periphery of the ring.

Similarly the channel 46 is formed in the bottom surface of the ring 26 and is closed by a closure plate 46A. The ring 27 and its recess 18 includes an entirely symmetrical arrangement defining an upper channel 45B and a lower channel 46B aligned with the channels 45 and 46. The channel 46 is separated from the channel 45B by the plate 46A so these water passages are separated and independent from each other.

The channels 45, 46, 45B and 46B are supplied with water by a water supply system as illustrated in FIG. 3. The water supply system comprises a plurality of supply pipes 47 each of which is connected to a coupling 48 attached to the bottom plate 24. The number of pipes 47 is arranged to supply the required volume of injection liquid. Each pipe extends from the coupling 48 in a direction downwardly and inwardly to a coupling 49 at the hub.

The hub 22A mounted on the shaft 22 is of the type generally shown in U.S. Pat. No. 5,601,524 for supply of fluidizing water through the hollow shaft to the supply ducts.

In general the shaft 22 is connected to a water supply coupling at the lower end (not shown) so that water is supplied through a hollow interior of the shaft for connection to ducts 50 which extend outwardly to the couplings 49 for supplying the pipes 47.

Each coupling 48 of the series of pipes 47 is connected to a vertical conduit 51. Half of the vertical conduits extend through the lower ring 27 on into the upper ring 26 for communication with each of the two channels 45 and 46. The conduits 51 therefore each have a conduit portion 51C and 51D which extends from the conduit 51 to each respectively of the channels 46 and 45. Similarly the balance of the vertical conduits extend only into the lower ring 27, for communication with each of the two channels 45B and 46B. These conduits 51 each have a conduit portion 51A and 51B which extends from the conduit 52 to each respectively of the channels 45B and 46B.

Each conduit portion co-operates with a control valve assembly 52A, 52B, 52C and 52D respectively which is manually operable from the outside surface 28 of the rings for controlling the amount of water supplied from the conduit 51 to each of the channels so that the amount of water can be varied if required for varying the injection flow into the recesses through the respective injection openings.

Turning now to FIGS. 5, 6, 7 and 8, there is shown in more detail the construction of the discharge assembly 19 which allows discharge of the heavier materials from the recesses.

The assembly 19 comprises a duct 53 which is formed integrally from a resilient material and extends from a mouth 54 to an outer discharge end 55. The duct 53 includes a valve portion 56 and a tapered duct portion 57 extending from the mouth 54 to the valve portion 56. The duct defines an inner surface through which the heavier materials are discharged from the recesses to the launders 21A and 21B.

The tubular duct portion 57 has an outer surface 58 which is generally cylindrical and projects forwardly from the assembly 19. The mouth 54 is arranged as an annular surface lying in a plane at right angles to a central axis 59 of the duct 53 and surrounding the tapered tubular portion 57 and inside the outer surface 58.

Figure 5:
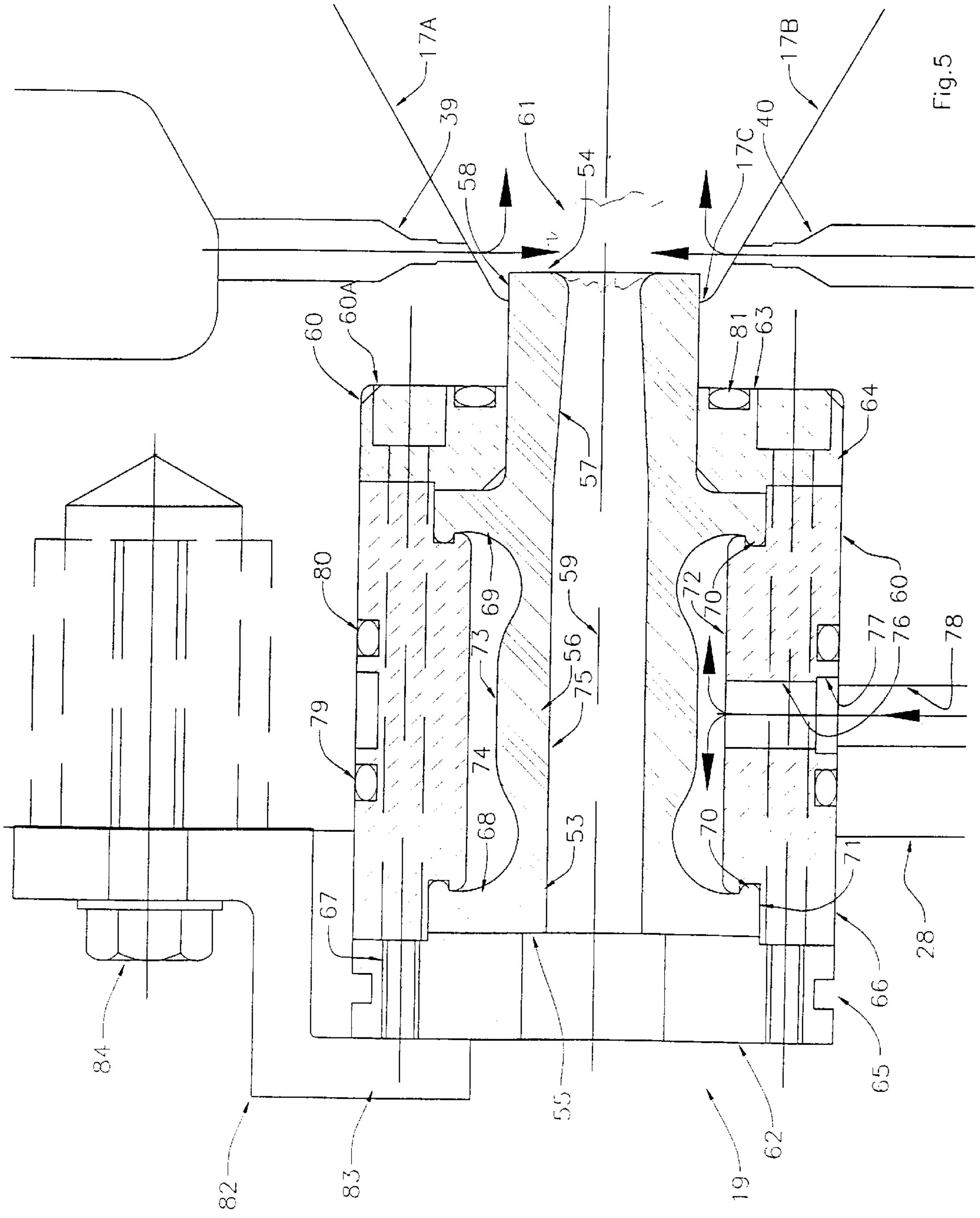
FIG. 5 is vertical cross sectional view similar to that of FIG. 1 showing on a further enlarged scale the construction of a single one of the discharge openings and co-operating valve.
Figure 6:
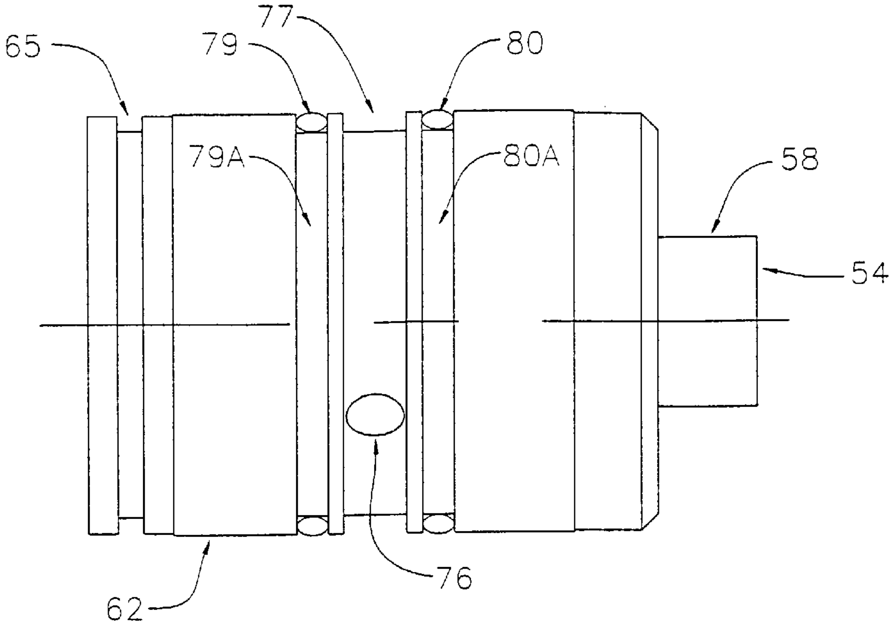
FIG. 6 is a side elevational view of the discharge opening and valve assembly of FIG. 5.

For each discharge assembly, the recess has an opening into which the mouth can project from a chamber 60 located between the recessed and the outer surface 28 of the ring. Thus a forward portion of the outer surface 58 and the mouth 54 projects slightly proud of the base 17C of the recess. The mouth 54 is thus substantially aligned with the jet from the inlet openings 39 and 40. In this way the jet from the inlet openings passes across the mouth in a sweeping action as shown in FIGS. 5 and 2A. As particularly shown in FIG. 2A, one of the injection openings is directly aligned with the opening in the mouth 54 so as to sweep across the opening generally diametrically to the opening. The injection openings 40 are staggered so that two of the injection openings are arranged symmetrically on either side of the opening in the mouth 54. In this way the full area of the mouth is swept by one of the openings 39 and two of the openings 40. In view of the fact that the openings are inclined to the line 42, any such sweeping action tends to move the swept material longitudinally of the recess away from the mouth 54 encouraging material migration around the ring in a direction opposite to the rotation.

In FIG. 5 is shown an oversize particle 61 which can enter the bowl due to a failure in the screening system which limits the size of the particles to those which can normally penetrate the opening in the mouth 54. In the event that an oversized particle enters the bowl, that particle can collect at the opening in the mouth and would otherwise cause a blockage. The sweeping action therefore of the injection openings tends to keep the discharge openings clear to allow continued operation of the separation system.

The tubular duct 53 is mounted within a housing 62 so that the forward end of the forward portion 57 projects out of a forward end 63 of the housing 62. The housing has a generally cylindrical outer surface to be received as a sliding fit within the cylindrical chamber 60 within the respective ring 26, 27.

The housing 62 comprises a front end plate 64 and a rear end plate 65 together with a cylindrical center section 66. The end plates are clamped together squeezing the cylindrical section 66 by a series of bolts 67 at angularly spaced positions around the periphery of the end plates. The number of bolts can of course vary.

The valve portion 56 of the tubular duct 53 includes a pair of clamping rings 68 and 69 at opposite ends of the valve portion 56. Thus the ring 68 is arranged at the outer end 55 of the duct 53. The ring 69 is located at the junction of the valve portion 56 and the end portion 57. The rings 68 and 69 surround the main cylindrical body of the duct 53 and extend radially outwardly therefrom. The clamping rings each have a planar end face for engaging the inner face of the respective end plate 64, 65. The inwardly facing surfacing of the clamping rings includes an annual rib 70 which is located at the outer edge of the ring and projects axially along the duct 53 toward the opposite ring. The outer part of each ring and the rib 70 is located within a recess 71 in the cylindrical housing portion 66. Thus the clamping of the cylindrical housing portion 66 between the end plates squeezes or clamps the outer portion of the clamping rings to hold the clamping rings in place against movement axially or radially relative to the housing.

An inner cylindrical surface 72 of the cylindrical portion 66 is spaced outwardly from an outer surface 73 of the valve portion of the duct 53. Thus there is defined a chamber 74 between the outer surface 73 and the inner surface 72 for receiving pressurized fluid for squeezing the valve portion 56 inwardly to effect closure of the valve portion by the inside surface 75 of the valve portion moving inwardly toward the axis 59 until the surface 75 closes upon itself to effect a closure of the duct 53 at the valve portion 56.

The pressurized fluid for activating the valve portion is supplied to the chamber 74 through one or more radial ducts 76 which extend from the chamber 74 to an outer recess 77 in the cylindrical outer surface of the housing 62. The annular channel 77 surrounding the housing 62 co-operates with a supply duct 78 formed within the body of the ring in which the assembly 19 is located. The duct 78 is thus fixed in position as a fixed part of the ring and is positioned so as to communicate with an inside surface of the chamber 60 so that the duct 78 breaks out at the surface of the chamber 60 to effect the necessary communication with the annular channel 77 of the assembly 19.

In order to prevent escape of the pressurizing fluid from the duct 78, the housing 62 carries a pair of sealing rings 79 and 80, each on a respective side of the annular channel 77 and each received within its own respective recess 79A, 80A annularly around the outside the housing 62 on respective sides of the annular channel 77.

The housing 62 can therefore simply slide into place within the chamber 60 with the sealing rings 79 and 80 sliding against the inside cylindrical surface of the chamber until the end wall 63 of the housing abuts the end face 60A of the chamber 60. The end face 63 carries a sealing ring 81 in an annular channel surrounding the outside surface 58 of the duct 53 so as to provide a seal to prevent material passing around the outside surface 58 through the opening between the recess and the chamber 60.

The housing 62 is held in place and prevented from outward movement by a holding bracket 82 which is attached to the outside surface 28 of the ring at one side of the chamber 60 and extends therefrom outwardly from the surface 28 to a clamping arm 83 of the bracket which engages the rear surface of the end plate 65. The bracket is held in place by a bolt 84 engaging into a bowl in the outer surface 28. The discharge assembly 19 can therefore be simply and readily removed from the bowl by removing or twisting the arm 83 allowing the end plate 65 to be manually grasped with a pulling tool which engages the annular groove in the plate 65 and pulled outwardly thus simply sliding the housing 62 out of the chamber 60. A replacement can then be inserted in opposite manner and locked in place by the bracket 82. The assembly 19 contains the whole of the valve and the whole of the duct as a single element so that it can be supplied as a spare part in assembled position or can be removed for disassembly and repair if necessary. The whole of the assembly 19 contains the tubular duct 53 which defines both of the valve section 56 and the mouth 54. There is no necessity therefore for separate elements inserted into the bowl from the interior of the bowl and the mouth is defined by the end portion of the duct 53.

Figure 7:
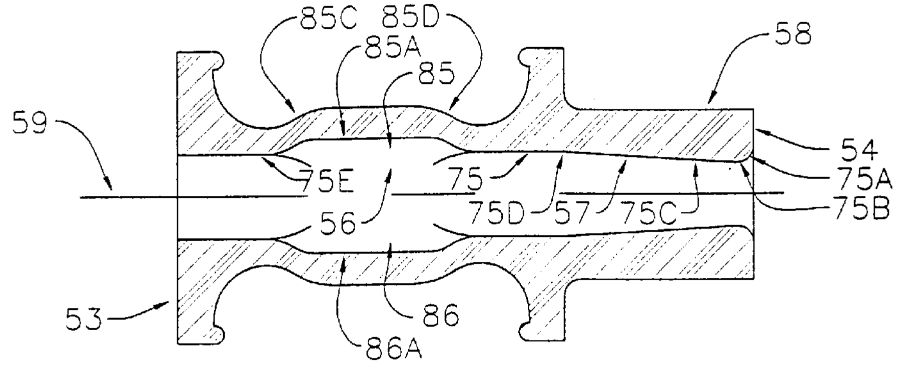
FIG. 7 is a cross sectional view of the resilient discharge conduit and pinch valve sleeve only of the assembly of FIG. 5, the cross section being taken along the lines 7—7 of FIG. 8.
Figure 8:
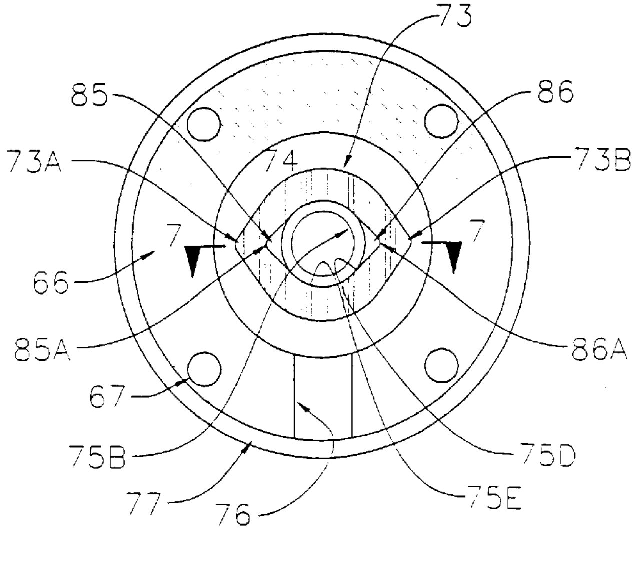
FIG. 8 is a cross sectional view along the lines 8—8 of FIG. 5.

The duct portion 53 is shown separated from the housing in FIG. 7 and its shape in cross section is shown in FIGS. 5, 7 and 8. The inside surface 75 of the duct 53 includes a first portion at the mouth 54 which is indicated at 75A which has a curved or chamfered inlet mouth area from the end face at the mouth 54 which narrows from the end face into a narrowest section 75B adjacent the mouth 54. From that narrowest portion 75B, the inside surface tapers gradually outwardly as indicated at 75C within the front portion 57 so that the surface 75C gradually increases in diameter up to circular cross section 75D at the commencement of the valve section 56. The tapered portion of the duct could of course be made much shorter or much longer by extending it partway or complete into the valve section.

The valve section 56 has an inside surface portion 75E which is generally cylindrical but is shaped with a pair of lobes or recesses 85 and 86 extending outwardly from the cylindrical surface 75E at two opposed positions around the axis 59. Thus the lobes or recesses 85, 86 define an apex 85A, 86A lying in the plane of the cross section of FIG. 7 which is an axial plane of the duct 53. In cross section as shown in FIG. 8, therefore, the lobes 85, 86 cause the inside surface 75E to follow substantially an ellipse with apexes at the ends of the ellipse 85A, 86A.

As shown in FIG. 8, the thickness of the wall of the valve portion 56 is substantially constant so that the outside surface 73 also defines two lobes 73A, 73B which are aligned with the lobes or recesses 85 and 86. Thus the outside surface 73A in the cross section shown in FIG. 8 is generally elliptical. The shape as shown is not exactly elliptical in a mathematical sense since the shape is designed more as the addition of the two lobes to an otherwise cylindrical body although it could be. As shown in FIG. 7, the lobes also have a length along the valve portion 56 so that the lobes extend from a first end 85C to a second end 85D. Thus the lobes extend along the majority of the valve portion and are located along that length of the valve which is the portion that distorts during the operation of the valve to pinch the material inside the valve portion.

The shaping of the valve portion 56 in the above "elliptical" manner significantly enhances the operation of the pinch valve in that it reduces the pressure necessary to effect a full pinching action and also it can increase the speed of pinching. This effect is obtained since the valve portion 56 is not cylindrical and therefore not symmetrical but instead has a preferred axis of compression in that the compression normally takes place at right angles to the plane containing the apexes of the lobes since the lobes themselves are resistant to compression. The normal cylindrical or symmetrical arrangement of the pinch valve has a disadvantage that the pinch valve has no particular preferred direction of pinching so that it tends to resist pinching due to the fact that the pressure around the cylindrical pinch valve is constant. The pinch valve as described above however provides a preferred direction of pinching so that it is more ready to collapse in that preferred direction and not in some irregular cross section that may promote leakage and accelerated wear.

Figure 4:
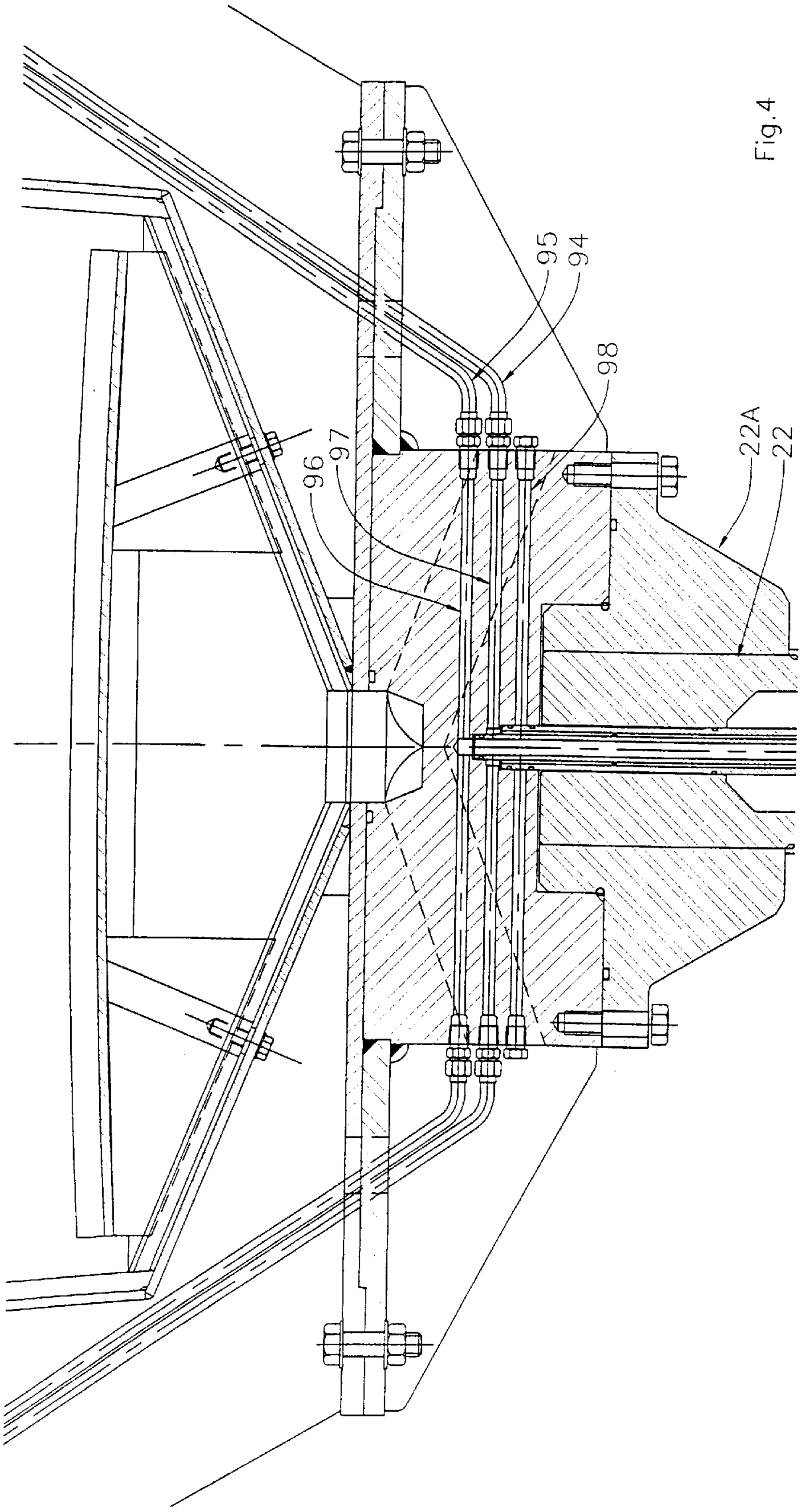
FIG. 4 is a vertical cross sectional view similar to that of FIG. 1B showing the hub portion only of the bowl.

Each assembly 19 has its own duct 78 communicating through the body of the ring. Thus in FIG. 2 it will be noted that the assemblies 19 of the ring 27 have a relatively short duct 78 extending to a coupling 87 at the base plate 24. Each assembly 19 therefore has its own coupling 87 at the base plate 24. The assemblies 19 of the ring 26 have a duct 78A which extends through the body of the ring 26 to a further duct portion 78B which extends through the ring 27 to a coupling 88 at the base plate 24. The assemblies 19 of the ring 27 are angularly offset from those of the ring 26 so that the duct 78B passes between two of the assemblies 19 of the ring 27. The couplings 87 are therefore angularly offset from the couplings 88. Compressing fluid for the assemblies 19 of the ring 27 is supplied through a pipe 89 and compressing fluid for the assemblies 19 of the ring 26 is supplied through a pipe 90. The two pipes are received within a recess 91 of a series of stiffening webs 92 arranged around the bowl and extending from the base plate 24 to the wall portion 1 6A and to the hub 22A. The pipes 88 and 89 are therefore annular around the bowl underneath the base plate 24 and each coupling 87, 88 is connected to the respective pipe by a plurality of pipe portions 92 and 93 which are connected to the main supply pipes 89 and 90 by T-couplings. Fluid is supplied to the pipes 89, 90 by pipes 94, 85 which extend from supply ducts 96 and 97 in the hub 22A as best shown in FIG. 4.

The supporting webs 92 connect to a horizontal circular base plate 92A forming a base support wall for the bowl. The hub 22A carries a top plate 92B which is attached to the top surface of the hub and bolts to the base plate 92A by bolts 92C so as to attach the bowl to the hub. The base plate 92B is supported by a plurality of angularly spaced webs 92D relative to the underside of the plate 92D and the side of the hub.

The constriction of the hub and the supply of fluidizing liquid through the hub from the shaft and the supply of compressing fluid through the hub from the shaft is described and illustrated in detail in U.S. Pat. No. 5,601,524 and therefore will not be described in detail herein.

It will be noted however that the fluidizing liquid is supplied through a single source through the shaft and then connects to a plurality of angularly spaced supply ducts to the pipes 47. The compressing fluid, which is generally air, is supplied through two supply ducts 96, 97 to the pipes 94, 95. A third supply duct 98 which is described in the above patent is not used for the supply of compression fluid but instead is used simply as a bleed line to bleed off any leaking compression fluid or fluidizing liquid to prevent the migration or cross contamination of the air or water between the air lines 96, 97 and the water lines 50.

Each of guides bodies 23 comprises a generally spherical body portion 100 with a pair of cylindrical mounting portions 101 and 102 extending upwardly and downwardly from the top and bottom respectively of the spherical body 100. Other cross sections for the guide body not limited to the shape described here are also possible. The cylindrical portions 101 and 102 are counter bored to receive mounting pins 103 and 104 carried on the respective upper and lower side walls 17A and 17B at positions spaced outwardly from the base 17C. The spherical body has a hole 105 drilled through the spherical body and lying on or aligned with the axis 59 of the discharge assembly 19. The discharge assembly 19 can therefore be cleaned by insertion of an elongate probe through the hole 105 from the interior of the bowl and into the mouth 54 of the discharge assembly for cleaning the interior of the duct 53.

The guide body 23 is mounted on the pins 103 and 104 by slitting the spherical body from the side adjacent the discharge mouth 54 through to a line at the side of the pins 103, 104 spaced from the mouth 54. Thus the guide body 23 can simply be pressed into place by opening the slit and distorting the opened cylindrical portions 101 and 102 to allow them to be pressed over the fixed pins 103, 104.

The guide body 23 limits material on material compaction in front of the discharge assembled 19 and into the discharge opening 54. The guide body 23 ensures only enriched concentrates are removed by preventing or minimizing removal of material at the concentrating surface. This also helps minimize disruption of the concentrating surface which is necessary for the efficient operation of this machine.

The general shape of the bowl including the two recesses 17 and 18 together with the first conical section 16 is substantially as described in U.S. Pat. No. 5,586,965. However the bowl as shown herein is modified relative to the bowl of the above patent in that it includes a bottom discharge opening 11B and a base plate 11A above the bottom discharge opening.

The bottom discharge opening 11B communicates with two or more discharge ducts 11C passing through the hub 22A and extending radially outwardly and downwardly so that material discharging through the bottom discharge opening 11B can pass outwardly and downwardly for collection in a suitable container at the shaft 22.

In normal operation of the bowl as shown herein, the feed material is separated so that the heavier particles collect within the recesses and the lighter particles and water escape over the mouth 12. The heavier particles are then discharged by periodic opening of the pinch valves to allow release of a plug of collected heavier particles. The tapered shape of the inside surface 75C ensures that the plug can freely escape into the valve section and through the valve section to the exterior launder for collection. The timing of the valves of the upper ring 17 can be different from the timing of the valves of the lower ring 18 in view of the different rates of collection of heavier particles in those rings.

As the tubular duct 53 is integrally formed from a resilient material, the action of the squeezing of the pinch valve section also acts to slightly distort the remainder of the tubular duct thus tending to release any materials such as clay collecting on the inside surface 75. Any collection of materials or blockages are therefore tended to be released by the flexing action plus in addition there are no joints or steps in the inside surface 75 which would in any way interfere with the smooth movement of the slug of heavier particles escaping through the discharge assembly. The assembly can be oriented (rotated) in any position in its mating concentrating ring bore without affecting its operation. There are no air lines to remove or install when changing pinch valves. There are no loose parts, fittings or fasteners that can fall into the machine when removing or installing pinch valves.

The injection of water through the opening 39 and 40 which are arranged in a cylindrical plane surrounding the axis creates a condition in which there is little or no effect of the centrifugal force in a direction longitudinal of the injection openings. Any tendency of particles therefore to be forced into the discharge openings in response to centrifugal force is thus significantly reduced or eliminated. Furthermore the direction of action of the injection openings provides a sweeping effect across the open mouth of the discharge assembly thus tending to sweep away any materials collecting in that area. The discharge ports are therefore maintained clean of larger particles so that the continuous separation can continue generally without interruption due to the presence of some larger particles which would otherwise cause a blockage.

Each fluidization hole is oriented perpendicular to the radial migration of concentrates to help prevent plugging of the fluidization holes and tilted 30° from vertical in the opposite direction of rotation to promote migration of the concentrates around the back of the rings. At least one fluidization hole is aligned in front of each pinch valve exit jet to blow material away from the entrance to the exit jet. The ring is "V" shaped to direct material to the pinch valve. It can also be flattened out in front of the fluidization holes so as to prevent material from compacting in an otherwise elliptically exposed hole.

In the event that the larger particles accumulate to a situation where blockage cannot be prevented, it is necessary to halt operation of the device, that is to halt the feed 15, to halt rotation of the bowl and to effect discharge of the heavier particles collected within the recess. As these heavier particles are generally the larger particles which have been collecting, it may not be necessary to collect the materials as concentrate but this can be done if preferred. The arrangement and orientation of the injection openings ensures that the recesses are properly swept and cleaned of larger or oversized particles since the whole of the recess is swept out by the injection liquid for that liquid and the particle to run down the walls 16A and across the inclined bottom surface of the bowl underneath the base plate 11A to the discharge opening 11B. Cleaning of the bowl is therefore a relatively quick substantially automatic process requiring a short term shut down of the system. Once the oversized materials have been swept from the bowl and collected through the discharge ports 11C, the system can be restarted and the concentration of materials in continuous mode recommenced.

The pinch valve assembly can also be used in other types of machines.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A method of separating a slurry containing intermixed particulate materials of different specific gravity comprising:

providing a centrifuge bowl having a peripheral wall and an open mouth;

rotating the bowl about a longitudinal axis so as to rotate the peripheral wall around the axis;

feeding the materials to the bowl so as to pass over the peripheral wall and causing a heavier portion of the materials to collect on the peripheral wall while a lighter portion of the materials in the slurry escapes over the open mouth;

defining on the peripheral wall at least one axially localized, annular recess for collecting the heavier portion of the materials;

defining in the recess an upper side wall, a lower side wall and an annular base interconnecting the side walls;

providing at the recess a plurality of angularly spaced discharge ports each for allowing materials collecting in the recess to discharge outwardly from the peripheral wall, each discharge port being located with a mouth in the base;

collecting the outwardly discharged materials;

injecting fluidizing liquid into the recess through a plurality of fluid injection ports arranged at spaced positions around the recess for fluidizing the material in the recess;

and arranging the mouth of each discharge port relative to a respective one of the injection ports such that liquid from the injection port is directed across the mouth of the discharge port so as to sweep any material collected on the mouth from the mouth.

2. The method according to claim 1 including providing within the recess in front of each discharge port a material guide body arranged to direct material passing to the discharge port around an outer periphery of the guide body, the guide body having a bore therethrough which is aligned with the discharge port to allow passage through the bore and into the discharge port of a cleaning probe.

3. A method of separating a slurry containing intermixed particulate materials of different specific gravity comprising:

providing a centrifuge bowl having a peripheral wall, a base and an open mouth;

rotating the bowl about a longitudinal axis so as to rotate the peripheral wall around the axis;

feeding the materials to the bowl so as to pass over the peripheral wall and causing a heavier portion of the materials to collect on the peripheral wall while a lighter portion of the materials in the slurry escapes over the open mouth;

defining on the peripheral wall at least one axially localized, annular recess for collecting the heavier portion of the materials;

providing at the recess a plurality of angularly spaced discharge ports each for allowing materials collecting in the recess to discharge outwardly from the peripheral wall, each discharge port being located with a mouth in the recess;

collecting the outwardly discharged materials;

injecting fluidizing liquid into the recess through a plurality of fluid injection ports arranged at spaced positions around the recess for fluidizing the material in the recess;

providing a discharge opening in the bowl at the base of the bowl;

and periodically halting rotation of the bowl and feed of the slurry to the bowl and cleaning the bowl and the discharge ports by causing material in the bowl to collect at the base and discharge through the discharge opening.

4. The method according to claim 3 including arranging the mouth of each discharge port relative to a respective one of the injection ports such that liquid from the injection port is directed across the mouth of the discharge port so as to sweep any material collected on the mouth from the mouth.

5. The method according to claim 3 including providing within the recess in front of each discharge port a material guide body arranged to direct material passing to the discharge port around an outer periphery of the guide body, the guide body having a bore therethrough which is aligned with the discharge port to allow passage through the bore and into the discharge port of a cleaning probe.

6. A method for separating a slurry containing intermixed particulate materials of different specific gravity comprising:

providing a centrifuge bowl having a peripheral wall and an open mouth;

rotating the bowl about a longitudinal axis so as to rotate the peripheral wall around the axis;

feeding the materials into the bowl such that the materials pass over the peripheral wall to cause a heavier portion of the materials to collect on the peripheral wall while a lighter portion of the materials in the slurry escapes over the open mouth;

providing a plurality of angularly spaced discharge ports each having a mouth in the bowl for allowing materials collecting on the peripheral wall to discharge outwardly from the peripheral wall;

collecting the outwardly discharged materials;

providing for each discharge port a discharge duct extending outwardly from the mouth inside the bowl through a wall of the bowl to a valve in the duct operable to alternately halt and release the flow of the material in the duct;

providing the valve as a flexible ring portion of the discharge duct which can be compressed inwardly to close the discharge duct;

providing the discharge duct with an inner tubular wall, extending from the mouth to the rings which tubular wall is formed from a resilient material and connected to the ring;

and compressing the ring to cause flexing of the inner tubular wall for dislodging material tending to cling to the inner tubular wall.

7. The method according to claim 6 including forming the inner tubular wall integral with the ring.

8. The method according to claim 6 including causing an end of the inner tubular wall to form the mouth of the duct.

9. The method according to claim 6 including providing a taper on an inside surface of the inner tubular wall so as to increase in diameter from the mouth to the ring.

10. The method according to claim 6 including providing the valve a housing surrounding the ring and defining a chamber between the ring and the housing and providing a fluid supply duct for supplying a compression fluid to the chamber for compressing the ring.

11. The method according to claim 10 including providing on the ring an inner surface which in transverse cross-section has a recess extending to one side such that a first dimension across the ring from said one side to a position diametrically opposed to said one side is greater than a second dimension across the ring at right angles to the first dimension.

12. The method according to claim 6 including providing:

a housing surrounding the ring and defining a chamber between the ring and the housing, the housing having an outer surface;

a bore in the peripheral wall of the bowl which extends to an opening in an outer surface of the peripheral wall;

a compression fluid communication duct in the peripheral wall communicating with the cylindrical bore;

and arranging the housing, the ring and the discharge duct as an assembly which is insertable as an assembly into the bore such that, when inserted, the outer surface of the housing is received into the bore, the fluid communication duct connects to the chamber and the discharge duct extends into the bowl such that a mouth of the discharge duct defines said discharge port.

13. A method for separating a slurry containing intermixed particulate materials of different specific gravity comprising:

providing a centrifuge bowl having a peripheral wall and an open mouth;

rotating the bowl about a longitudinal axis so as to rotate the peripheral wall around the axis;

feeding the materials into the bowl such that the materials pass over the peripheral wall to cause a heavier portion of the materials to collect on the peripheral wall while a lighter portion of the materials in the slurry escapes over the open mouth;

providing a plurality of angularly spaced discharge ports each having a mouth in the bowl for allowing materials collecting on the peripheral wall to discharge outwardly from the peripheral wall;

collecting the outwardly discharged materials;

providing for each discharge port a discharge duct extending outwardly from the mouth with a valve in the duct operable to alternately halt and release the flow of the material in the duct;

providing on the valve a flexible ring surrounding the discharge duct which can be compressed inwardly to close the discharge duct;

and providing on the ring an inner surface which in transverse cross-section has a recess extending to one side such that a first dimension across the ring from said one side to a position diametrically opposed to said one side is greater than a second dimension across the ring at right angles to the first dimension.

14. The method according to claim 13 including providing on the ring an inner surface which in transverse cross-section has a pair of opposed recesses extending to opposite sides such that a first dimension across the ring at said opposed sides is greater than a second dimension across the ring at right angles to the first dimension.

15. The method according to claim 14 including arranging the recesses to extend along the ring in a direction longitudinal of the duct.

16. The method according to claim 14 including arranging the recesses each to extend substantially to an apex lying in an axial plane of the ring.

* * * * *